US008831335B2

(12) United States Patent
Koizumi et al.

(10) Patent No.: US 8,831,335 B2
(45) Date of Patent: Sep. 9, 2014

(54) STEREO MATCHING PROCESSING APPARATUS, STEREO MATCHING PROCESSING METHOD AND COMPUTER-READABLE RECORDING MEDIUM

(75) Inventors: Hirokazu Koizumi, Osaka (JP); Toshiyuki Kamiya, Osaka (JP); Hiroyuki Yagyuu, Osaka (JP)

(73) Assignee: NEC Solution Innovators, Ltd., Tokyo (JP)

( * ) Notice: Subject to any disclaimer, the term of this patent is extended or adjusted under 35 U.S.C. 154(b) by 1021 days.

(21) Appl. No.: 12/292,766

(22) Filed: Nov. 25, 2008

(65) Prior Publication Data

US 2010/0128974 A1    May 27, 2010

(51) Int. Cl.
*G06K 9/00* (2006.01)
*G06T 7/00* (2006.01)

(52) U.S. Cl.
CPC ..... *G06T 7/0075* (2013.01); *G06T 2207/10012* (2013.01); *G06T 2207/30184* (2013.01)
USPC ...................................................... 382/154

(58) Field of Classification Search
USPC ...................................................... 382/154
See application file for complete search history.

(56) References Cited

U.S. PATENT DOCUMENTS

| 6,735,348 B2 * | 5/2004 | Dial et al. ...................... 382/293 |
| 6,970,593 B2 | 11/2005 | Furukawa |
| 2002/0061132 A1 | 5/2002 | Furukawa |
| 2004/0247175 A1 * | 12/2004 | Takano et al. ................. 382/154 |
| 2007/0025595 A1 * | 2/2007 | Koizumi et al. ............... 382/103 |
| 2008/0065349 A1 * | 3/2008 | Minami et al. ................ 702/158 |

FOREIGN PATENT DOCUMENTS

| JP | 3-167678 | 7/1991 |
| JP | 3-167678 A | 7/1991 |
| JP | 4-299474 | 10/1992 |
| JP | 2002-63580 A | 2/2002 |
| JP | 2002-157576 | 5/2002 |
| JP | 2006-113832 A | 4/2006 |

OTHER PUBLICATIONS

Mikio Takagi, et al., "Handbook of Image Analysis," pp. 597-599, 1991.
Notification of Reason(s) for Rejection dated Oct. 2, 2012, with English translation.

* cited by examiner

*Primary Examiner* — Amir Alavi
*Assistant Examiner* — Kenny Cese
(74) *Attorney, Agent, or Firm* — McGinn IP Law Group, PLLC

(57) ABSTRACT

Improving stereo matching speed and accuracy, an image data input unit acquires image data of plural images of a predetermined region captured from plural different positions. A reference disparity setting unit sets a reference disparity suitable for the plural images. The search range setting unit sets a predetermined range smaller than the image range as a search range for stereo matching, by referring to points in the images between which the reference disparity set by the reference disparity setting unit is provided. A stereo matching unit searches out, for an arbitrary point in one of the plural images, a point in the other image that matches the arbitrary point, from the search range set by the search range setting unit, by referring to a point in the other image that provides the reference disparity set by the reference disparity setting unit.

21 Claims, 14 Drawing Sheets

STEREO MATCHING PROCESSING APPARATUS, STEREO MATCHING PROCESSING METHOD AND COMPUTER-READABLE RECORDING MEDIUM

BACKGROUND OF THE INVENTION

1. Field of the Invention

The present invention relates to a stereo matching processing apparatus, a stereo matching processing method, and a computer-readable recording medium. More particularly, the present invention relates to a method for automatically generating three-dimensional data from stereo images.

2. Description of the Related Art

Stereo matching of images acquired from artificial satellites, aircraft, etc. to generate three-dimensional landform data [Digital Surface Model (DSM) data] is widely employed as one method of automatically generating three-dimensional data from stereo images. A stereo matching process is for finding matching points, at which the same position is picked up, from two images or so-called stereo images that are captured from different viewpoints, and calculating the depth to an object of interest or its shape according to the principle of triangulation by using the disparity between the matching points.

Various stereo matching processing techniques have already been proposed. For example, Unexamined Japanese Patent Application KOKAI Publication No. H3-167678 discloses a method that employs an image correlation technique that is widely used. This image correlation technique is a method of finding matching points by setting a correlation window as a template in a left image, calculating a coefficient of intercorrelation between the template and a search window in a right image as their matching degree while moving the search window in the right image, and searching out a position at which the matching degree is high.

This method reduces the amount of processing by restricting the search window to move only in the direction of an epipolar line in the image, and thus can obtain, for each point in the left image, an amount of x-direction displacement, i.e., disparity, of a point in the right image that matches that point in the left image. An epipolar line is a line that, for a given point in one of stereo images, can be drawn in the other of the stereo images as a range in which a point that matches that given point can exist. Epipolar lines are described in "Handbook of Image Analysis" (editorially supervised by Mikio Takagi and Haruhisa Shimoda, published by University of Tokyo Press, January 1991, pp. 597-599).

Normally, the direction of an epipolar line is different from the direction of an image scanning line. However, coordinate transformation can reorient the direction of the epipolar line to be brought in line with the direction of the image scanning line. This coordinate transformation technique is described in "Handbook of Image Analysis" identified above. In a stereo image that is reoriented in the way described above, the matching point search window can be restricted to move only on the scanning line. Therefore, a disparity can be obtained as a difference between the x-coordinate values of the matching points in the left and right images.

Stereo images include a shaded portion (occlusion region) of an object. A matching technique that enables correct matching by not matching any region against this occlusion region by stereo matching is proposed (see Unexamined Japanese Patent Application KOKAI Publication No. H4-299474).

Unexamined Japanese Patent Application KOKAI Publication No. 2002-157576 describes a technique for a stereo image processing apparatus that can automatically generate three-dimensional data of a complicated object from satellite stereo images or aerial stereo images with no presence of an operator. The technique of Patent Literature 3 automatically corrects fault data portions such as noises, omissions, etc. in the three-dimensional data obtained by a stereo processing unit, by using information of outer shapes of buildings, etc. that is retrieved from map data stored in a map data storage unit.

The map data storage unit supplies map data representing outer shapes of buildings, etc. to a DSM data automatic correction unit.

SUMMARY OF THE INVENTION

When searching for a point that matches a given point in one of a pair of images, which are under a stereo matching process, from the other of the images, it will take a long time to complete the process if a scanning line (epipolar line) in the image is searched all along, which will also increase mismatching probabilities.

The present invention was made in view of the above circumstance, and an object of the present invention is to improve the speed and accuracy of a stereo matching process.

To achieve the above object, a stereo matching processing apparatus according to a first aspect of the present invention includes: image data acquiring means that acquires image data of a plurality of images of a predetermined region captured at a plurality of different positions; reference disparity setting means that sets a reference disparity suitable for the plurality of images; search range setting means that sets a predetermined range that is smaller than a range of the images as a search range for stereo matching, by referring to points in the images between which the reference disparity set by the reference disparity setting means is provided; and searching means that searches out, for an arbitrary point in one of the plurality of images, a point in the other of the images that matches the arbitrary point, from the search range set by the search range setting means, by referring to a point in the other image that provides the reference disparity set by the reference disparity setting means.

A stereo matching processing method according to a second aspect of the present invention includes: an image data acquiring step of acquiring image data of a plurality of images of a predetermined region captured from a plurality of different positions; a reference disparity setting step of setting a reference disparity suitable for the plurality of images; a search range setting step of setting a predetermined range that is smaller than a range of the image data as a search range for stereo matching, by referring to points in the images between which the reference disparity set at the reference disparity setting step is provided; and a searching step of searching out, for an arbitrary point in one of the plurality of images, a point in the other of the images that matches the arbitrary point, from the search range set at the search range setting step, by referring to a point in the other image that provides the reference disparity set at the reference disparity setting step.

A computer-readable recording medium according to a third aspect of the present invention stores a program for controlling a computer to function as: image data acquiring means that acquires image data of a plurality of images of a predetermined region captured from a plurality of different positions; reference disparity setting means that sets a reference disparity suitable for the plurality of images; search range setting means that sets a predetermined range that is smaller than a range of the images as a search range for stereo matching, by referring to points in the images between which the reference disparity set by the reference disparity setting means is provided; and searching means that searches out, for an arbitrary point in one of the plurality of images, a point in the other of the images that matches the arbitrary point, from the search range set by the search range setting means, by referring to a point in the other image that provides the reference disparity set by the reference disparity setting means.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1:
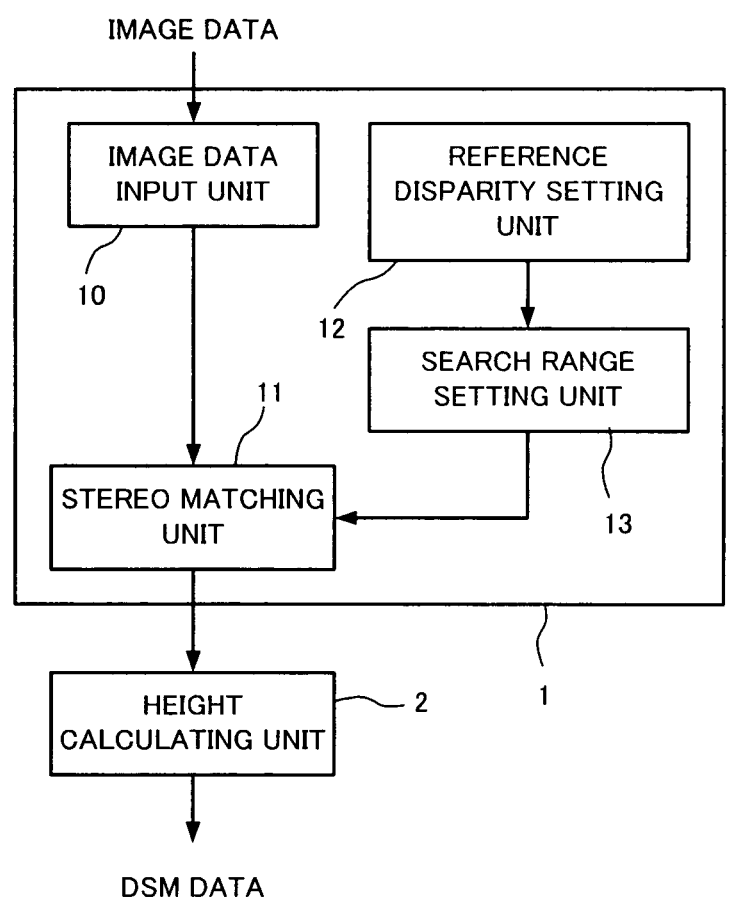
FIG. 1 is a block diagram showing an example configuration of a stereo image processing apparatus according to Embodiment 1 of the present invention.

Embodiments of the present invention will now be explained in detail with reference to the drawings. In the drawings, identical or equivalent components will be denoted by the same reference numerals.

Embodiment 1

FIG. 1 is a block diagram showing an example configuration of a stereo image processing apparatus according to Embodiment 1 of the present invention. The stereo image processing apparatus 1 includes an image data input unit 10, a stereo matching unit 11, a reference disparity setting unit 12, and a search range setting unit 13. The stereo image processing apparatus 1 is connected to a height calculating unit 2.

The image data input unit 10 has a function of entering image data, and enters plural pieces of image data to be used for a stereo matching process. Image data represents, for example, an image of an aerial photo converted into a digital image. Image data includes the position at which the image was captured, the direction in which the image was captured, the field angle, etc.

Figure 2:
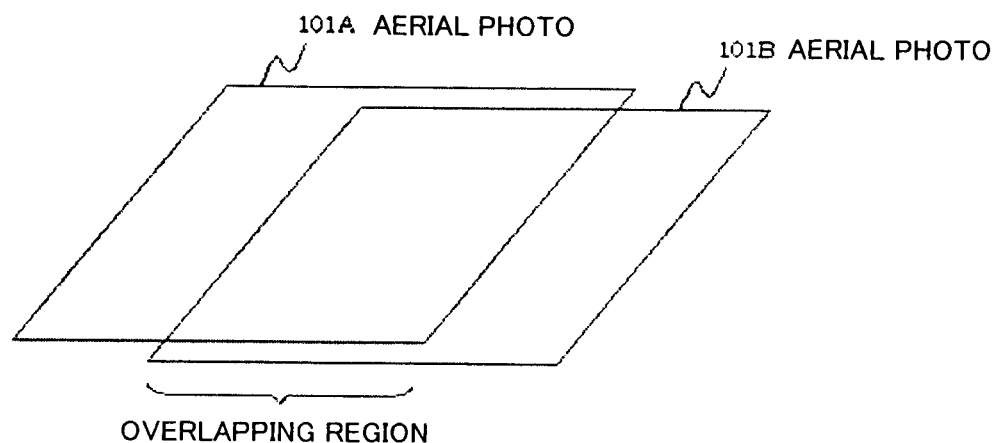
FIG. 2 is a diagram exemplarily showing an example of aerial photos to be converted to image data.

FIG. 2 exemplarily shows an example of aerial photos to be converted into image data. The aerial photos shown in FIG. 2 include an aerial photo 101A and an aerial photo 101B that were successively captured from aircraft that flew the sky. The aerial photo 101A and the aerial photo 101B were taken of the vision ahead of the aircraft, to include an overlapping vision that accounts for 60% of the range of each photo. The overlapping portions show images of the same region captured from different positions.

Images in the present embodiment are those generated by digitizing aerial photos, which are exemplified by the aerial photo 101A and the aerial photo 101B. Images used in the present invention are not limited to aerial photos, but may include digital images obtained from satellite photos, digital images captured by ordinary digital cameras, digital images obtained by scan-digitizing analog photos taken by ordinary analog cameras, etc.

The stereo matching unit 11 shown in FIG. 1 searches out from plural pieces of image data representing the same region captured from different positions, positions in the images at which the same terrestrial point is picked up. That is, the stereo matching unit 11 searches out a pair of points in the plurality of images that correspond to the same terrestrial point. A pair of points that correspond to the same terrestrial point are detected normally by checking image correlation between matching small regions in two images that are around such a terrestrial point, and finding positions that have the largest correlation coefficient.

Stereo matching processing techniques include various techniques such as those that match any points by determining a quantity of a general characteristic, those that determine correlation between left and right images, etc. Techniques used for the stereo matching process of the present embodiment are not limited. For example, a stereo matching process described in Examined Japanese Patent Application KOKOKU Publication No. H8-16930 may be used.

The height calculating unit 2 generates DSM data according to the principle of triangulation based on the disparity between the matching points obtained by the stereo matching process. For example, a predetermined displacement (disparity) is produced between the matching positions, in the pair of aerial photo 101A and aerial photo 101B, at which a terrestrial object exists. This displacement is measured in the stereo matching process, thereby the superficial height of the terrestrial object including the altitude value, and the coordinates of the terrestrial object in the horizontal direction, i.e., three-dimensional data of the terrestrial object are calculated.

Figure 3:
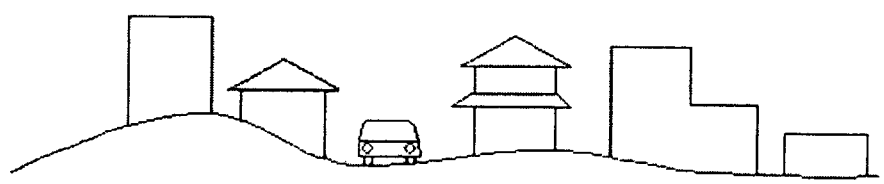
FIG. 3 is an exemplary diagram showing an example of a condition on a terrestrial surface in the real world.

FIG. 3 is an exemplary diagram showing an example of a condition on a terrestrial surface in the real world. FIG. 3 shows a cross section of a part of the real world, where terrestrial objects exist on an undulating landform.

Figure 4:
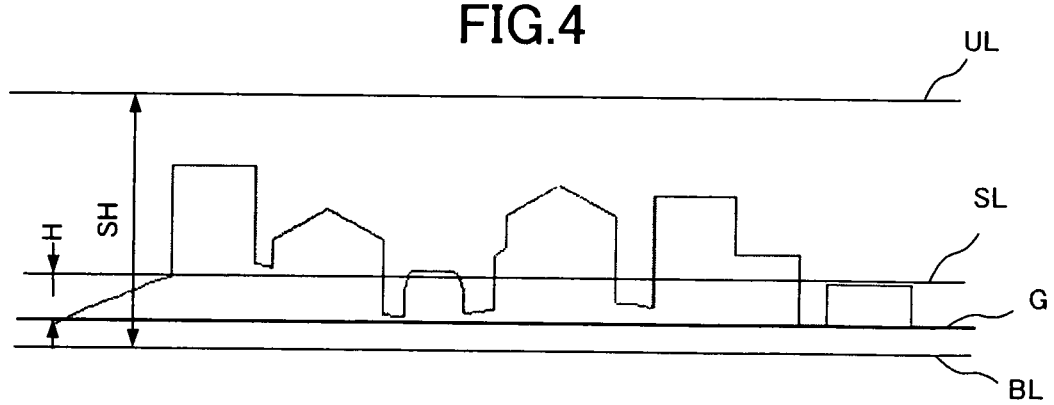
FIG. 4 is an exemplary diagram showing DSM data generated by stereo matching, from images obtained by shooting the part of the real world shown in FIG. 3.

FIG. 4 is an exemplary diagram showing DSM data generated by stereo matching of images obtained by shooting the part of the real world shown in FIG. 3. Since the DSM data represents the height data of an outermost surface, the height of a terrestrial surface that is covered by a roof or the like indicates the height of the roof including its altitude value.

The reference disparity setting unit 12 of FIG. 1 sets a disparity, which serves as a reference for searching for matching points between two images. For example, the reference disparity setting unit 12 sets as a reference, a disparity that determines a reference height of a range in a real space that is to be searched by stereo matching. The search range setting unit 13 sets a range that should be searched by the stereo matching unit 11 for finding matching points, based on points in the images between which the reference disparity set by the reference disparity setting unit 12 is obtained. Normally, a predetermined range that is smaller than the image range is set as a search range for stereo matching.

FIG. 4 conceptually shows a reference altitude and a height corresponding to a search range. For example, the reference altitude of the undulating terrestrial surface shown in FIG. 3 is set at a plane indicated by a line SL that is at a predetermined height H from a height G of the origin of the elevation of the aircraft. With reference to the plane indicated by the line SL, a range between a line BL and a line UL is set as a height SH corresponding to a search range in the real space.

Figure 5:
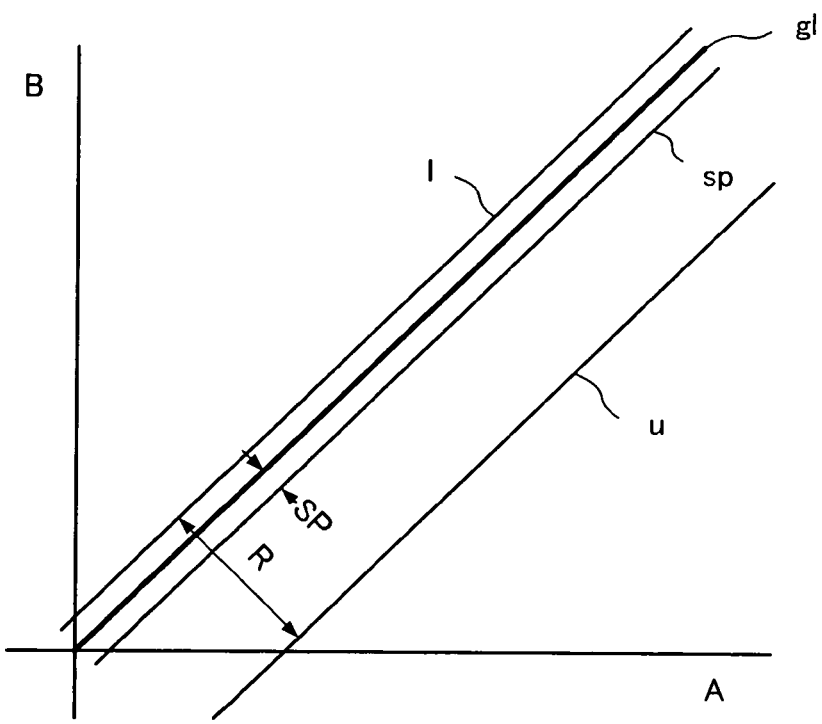
FIG. 5 is a diagram showing a search plane that explains a search range.

FIG. 5 shows a search plane that explains a search range. In FIG. 5, a scanning line (epipolar line) A in an image obtained by converting the aerial photo 101A and a scanning line (epipolar line) B, in an image obtained by converting the aerial photo 101B, that corresponds to the scanning line A are arranged perpendicularly to each other. A plane constituted by the axes A and B is generally referred to as search plane. The center position of each block on the axes A and B is expressed by a vertical line and a horizontal line, and a match between two images is represented by an intersection at which a vertical line and a horizontal line cross. The stereo matching unit 11 searches the scanning line A and the scanning line B for matching points between two images. Each of the lines laid in the search plane at an angle of 45 degrees indicates a constant height at which the disparity between the two images is constant.

In FIG. 5, for example, the line gl is a line that indicates a disparity at the reference height of the terrestrial surface, and indicates the origin of the elevation of the aircraft. The line sp indicates the height at which the reference disparity is obtained, and corresponds to the line SL shown in FIG. 4. The width SP corresponds to the height H shown in FIG. 4. The line u in FIG. 5 corresponds to the line UL in FIG. 4, and the line l corresponds to the line BL in FIG. 4. The range having a width R bounded between the line u and the line l represents the search range.

For example, the stereo matching unit 11 searches for a pair of matches on the lines A and B from between the line u and the line l shown in FIG. 5. A point on the scanning line B that matches a given point on the scanning line A is searched from a segment of a vertical line that runs on that given point on the scanning line A, which segment is between the line u and the line l. In a case where a point on the scanning line B is given and the target to be searched out is its matched point on the scanning line A, such a matched point is searched from a segment of a horizontal line that runs on that given point on the scanning line B, which segment is between the line u and the line l.

Figure 6:
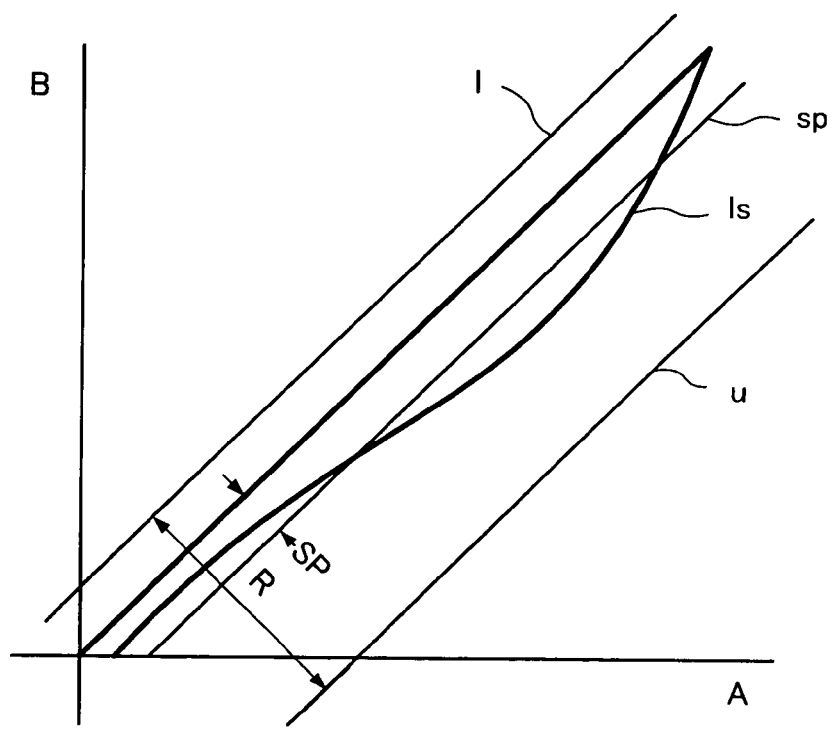
FIG. 6 is a diagram showing an example of a search range.

FIG. 6 shows one example of a search range. In a case where the difference in height between the highest and lowest levels of the undulation of the terrestrial surface is known, it is possible to set a range for searching for a terrestrial object whose estimated maximum height includes the difference in height between the highest and lowest levels of the undulation. In FIG. 6, the disparity at the undulation is indicated by the line ls. The search range is indicated by the line u and the line l that have therebetween a range R, which is set by including therein the difference in height between the highest and lowest levels of the undulation, based on a disparity sp obtained by adding an estimated average height of the terrestrial object to the average height of the undulation.

In a case where the altitude of the terrestrial surface is known, it is possible to perform a stereo matching process speedily by setting a search range to include the difference in height between the highest and lowest levels of the terrestrial surface and an estimated height of the terrestrial object. Since a limited ranged is searched, the probability that points in two images may be misrecognized as matching points is reduced.

Figure 7:
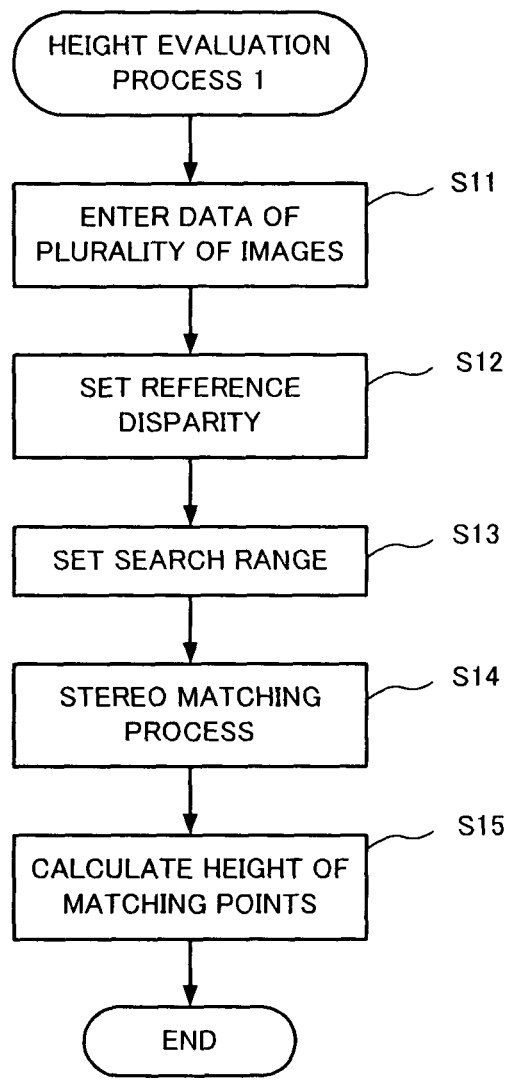
FIG. 7 is a flowchart showing one example of an operation of a height evaluation process according to Embodiment 1.

FIG. 7 is a flowchart showing one example of an operation of a height evaluation process according to Embodiment 1. The image data input unit 10 enters a plurality of images to which a stereo matching process will be applied (step S11). The reference disparity setting unit 12 sets a reference disparity based on, for example, the average altitude of the concerned region and an estimated height of a terrestrial object (step S12). The search range setting unit 13 sets a search range for the reference disparity, based on the altitude difference of the region and the height of the terrestrial object (step S13).

The stereo matching unit 11 searches out, for a point in one image, a point in the other image that matches it, from the set search range, by referring to a point in the other image that provides the reference disparity (step S14). The height calculating unit 2 calculates the height of each point and the coordinates of the point on the map based on the positions of the point in the plurality of images that are matched together between the images (step S15).

The stereo image processing apparatus 1 according to the present Embodiment 1 can perform a stereo matching process speedily by setting a reference disparity and a search range by taking into consideration the difference in height between the highest and lowest levels and an estimated height of the terrestrial object. Further, since a limited ranged is searched, the probability that points in two images will be misrecognized as matching points is reduced.

Embodiment 2

Figure 8:
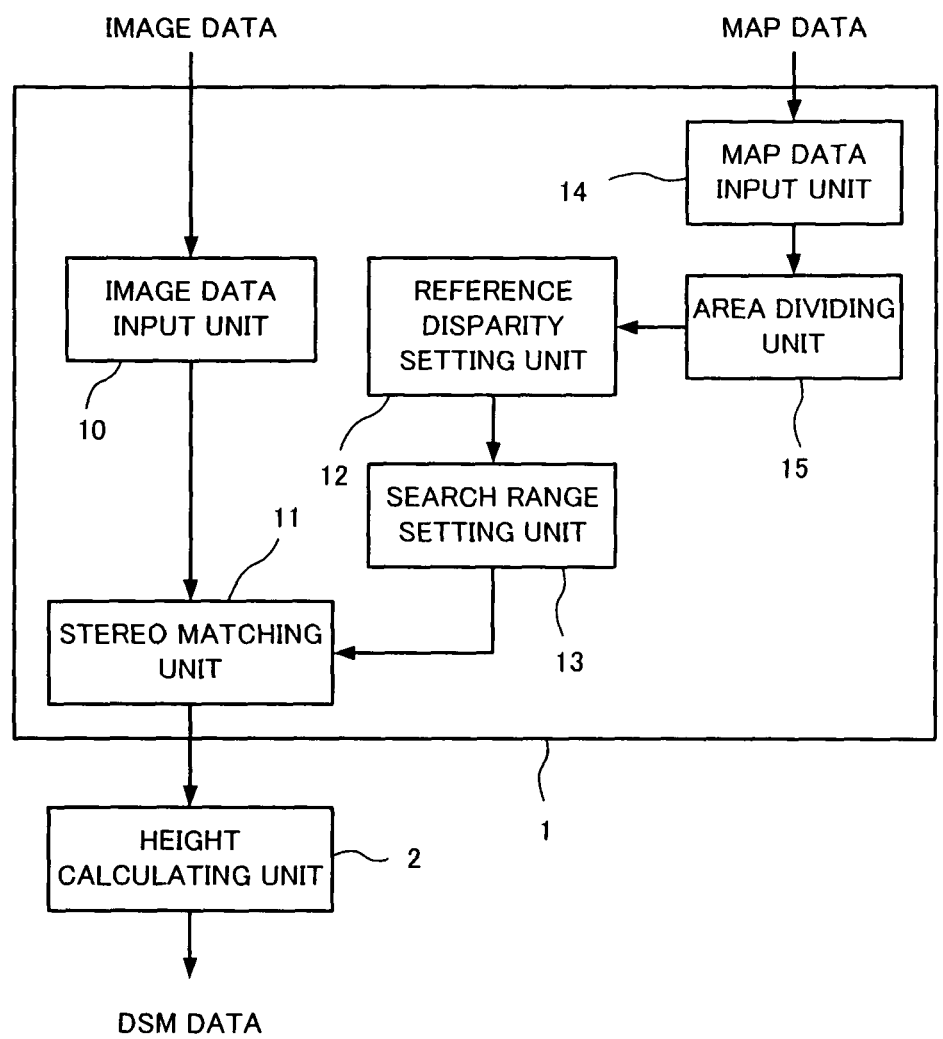
FIG. 8 is a block diagram showing an example configuration of a stereo image processing apparatus according to Embodiment 2 of the present invention.

FIG. 8 is a block diagram showing an example configuration of a stereo image processing apparatus 1 according to Embodiment 2 of the present invention. According to Embodiment 2, a reference disparity and a search range are set based on altitude data of map data.

The stereo image processing apparatus 1 of FIG. 8 includes a map data input unit 14 and an area dividing unit 15 in addition to the components of Embodiment 1. The map data input unit 14 enters map data of an area that is featured in the entered image data. The map data includes altitude data at each meshed point in the map.

The area dividing unit 15 divides the entered image data according to the altitude data. If the altitude data includes a small difference in height, the image may not be divided and may be treated as one area. In a case where the map data includes a difference in height that is larger than a predetermined range within the image range, the images will be divided into a plurality of areas.

The reference disparity setting unit 12 sets a reference disparity according to the altitude data for each area divided by the area dividing unit 15. The search range setting unit 13 sets a search range for each divided area, taking into consideration the difference in height included in the altitude data and an estimated height of a terrestrial object.

The stereo matching unit 11 searches for matching points between the plurality of images with reference to the reference disparity and search range set for each divided area, and extracts a pair of matching points. The height calculating unit 2 generates DSM data according to the principle of triangulation, based on the disparity between the matching points obtained by the stereo matching process.

Figure 9:
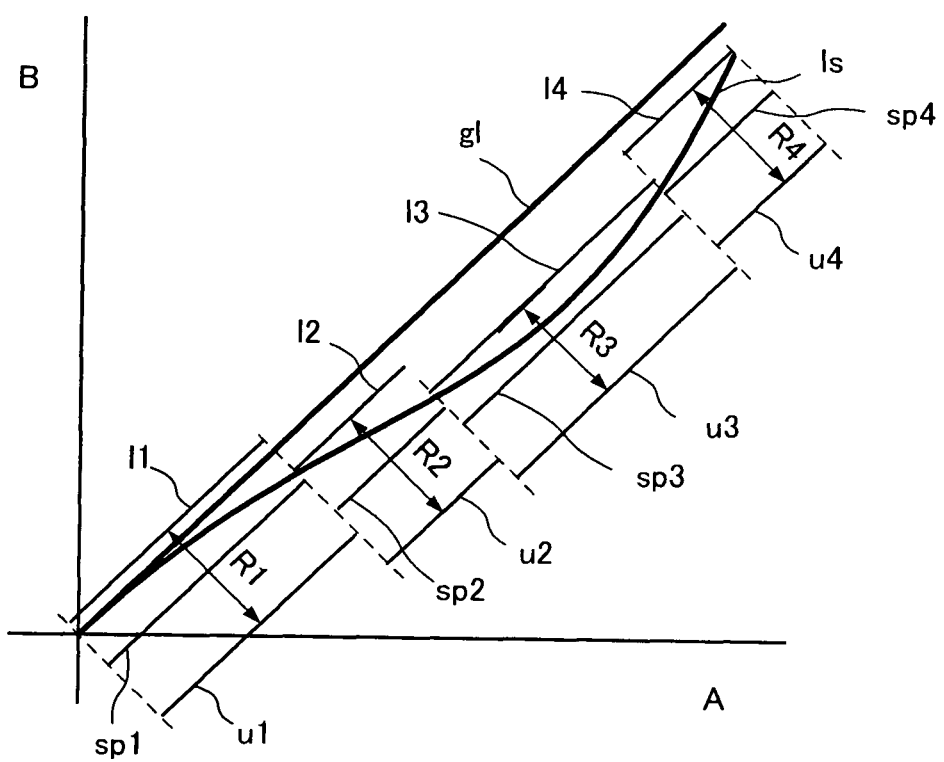
FIG. 9 is a diagram showing an example of a search plane in which a reference altitude and a search range are set for each divided area.

FIG. 9 shows an example of a search plane on which a reference disparity and a search range are set for each divided area. In the example of FIG. 9, there are four areas divided according to the undulation Is of the terrestrial surface. The reference disparities of the areas are sp1, sp2, sp3, and sp4, respectively. The search range of the first area is a range having a width R1 bordered by u1, and l1. The search ranges of the others are a range having a width R2 bordered by u2 and l2, a range having a width R3 bordered by u3 and l3, and a range having a width R4 bordered by u4 and l4, respectively.

As shown in FIG. 9, the search ranges are smaller than in FIG. 6. In a case where there is undulation having a difference in height, it is possible to restrict a search range to a small range in which a matching point exists, by dividing the image range into a plurality of areas and setting a search range for each divided area. As a result, it is possible to perform a stereo matching process speedily and accurately.

The area division can be made such that the difference in height in each area is equal to or smaller than a predetermined value. Alternatively, the dividing number may be determined according to the difference in height within the image range.

Figure 10:
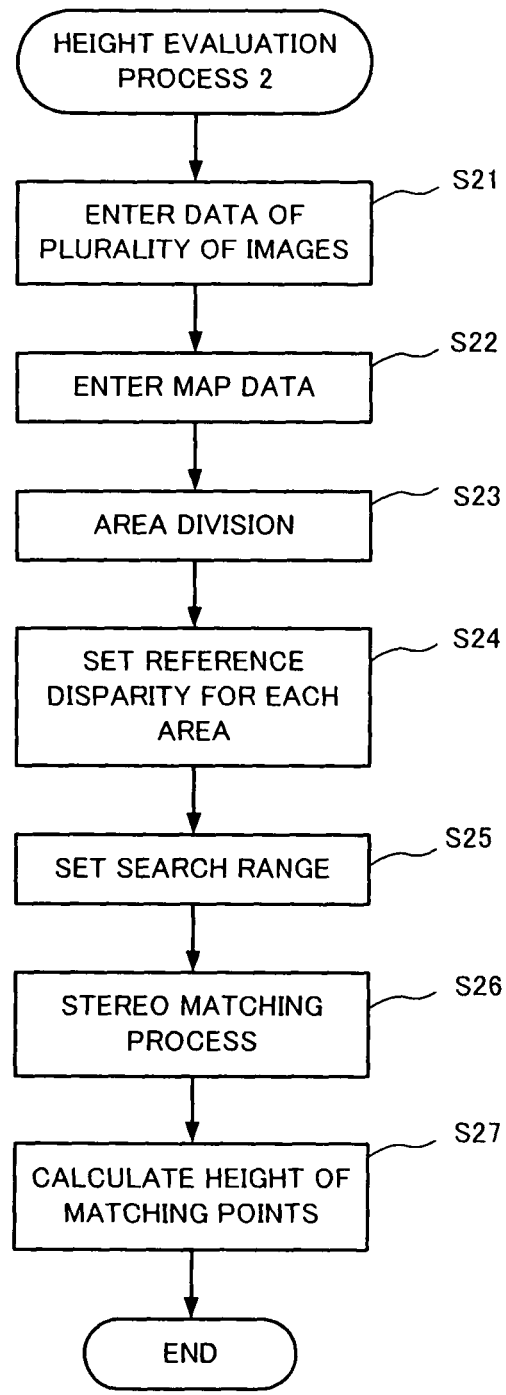
FIG. 10 is a flowchart showing one example of an operation of a height evaluation process according to Embodiment 2.

FIG. 10 is a flowchart showing one example of an operation of a height evaluation process according to Embodiment 2. When the image data input unit 10 enters a plurality of images to which a stereo matching process will be applied (step S21), the map data input unit 14 enters map data of the area featured in the images (step S22). The area dividing unit 15 divides the images into areas based on altitude data included in the map data (step S23).

The reference disparity setting unit 12 sets, based on the altitude data and the divided areas, a reference disparity for each divided area (step S24). The search range setting unit 13 sets a search range for each divided area according to the difference in height in that area (step S25).

The stereo matching unit 11 searches out, for a point in one of the images, a point in the other image that matches the point, from the search range set for each area, by referring to a point in the other image that provides the reference disparity (step S26). The height calculating unit 2 calculates the height of each point and the coordinates of the point on the map based on the positions of the point in the plurality of images that are matched together between the images (step S27).

The stereo image processing apparatus 1 according to Embodiment 2 can restrict the search range to a small range in which a matching point can exist, according to the altitude data in the map data. As a result, the stereo image processing apparatus 1 can perform a stereo matching process speedily and accurately.

Embodiment 3

Figure 11:
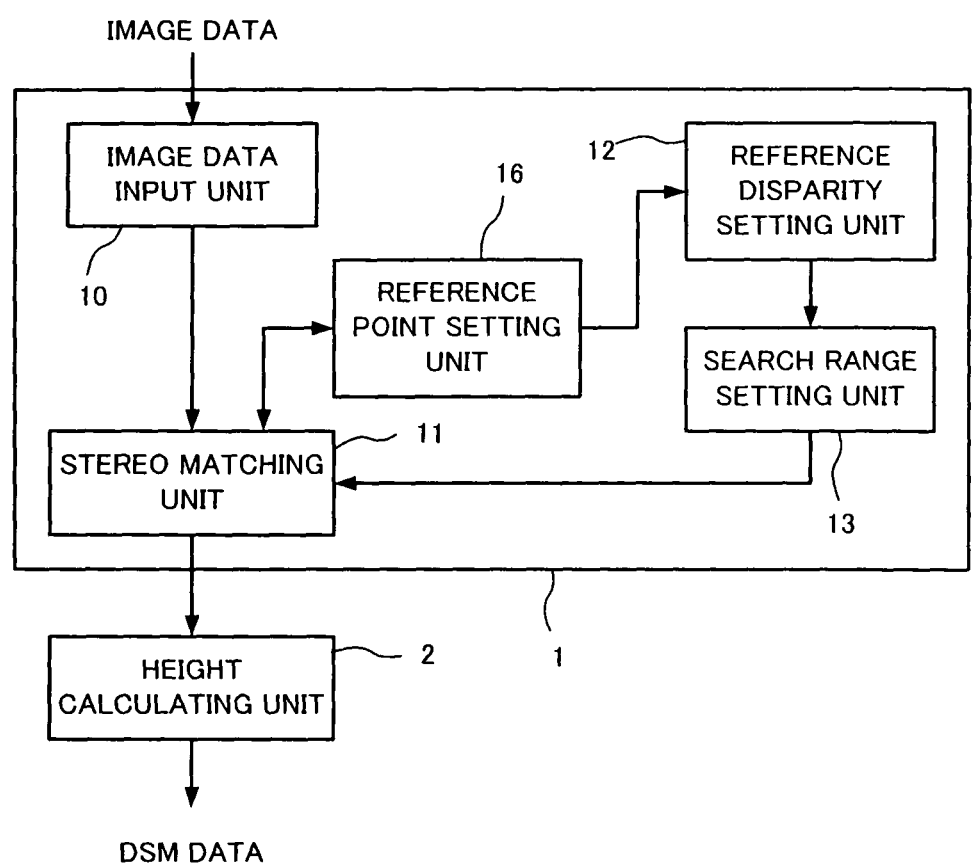
FIG. 11 is a block diagram showing an example configuration of a stereo image processing apparatus 1 according to Embodiment 3.

FIG. 11 is a block diagram showing an example configuration of a stereo image processing apparatus 1 according to Embodiment 3. The stereo image processing apparatus 1 according to Embodiment 3 includes a reference point setting unit 16 in addition to the components of Embodiment 1.

The reference point setting unit 16 selects in a predetermined manner, a reference point, which is one of points between which a reference disparity may be set, from an image entered by the image data input unit 10. For example, the reference point setting unit 16 randomly selects a predetermined number of points that corresponds to the size and scale of the image as reference points. Alternatively, the reference point setting unit 16 may select points at a predetermined distribution.

The reference point setting unit 16 makes the stereo matching unit 11 extract a pair of points that match each other between the plurality of images, one of which is each of the points selected by the reference point setting unit 16. The reference point setting unit 16 calculates three-dimensional data of each selected point, and sends the three-dimensional data of each selected point to the reference disparity setting unit 12.

The reference disparity setting unit 12 sets a reference disparity in a predetermined manner, based on the three-dimensional data received from the reference point setting unit 16. For example, the reference disparity setting unit 12 sets the average or median value of the heights of the three-dimensional data as a reference altitude, and sets the disparity at this reference altitude as a reference disparity. Alternatively, the reference disparity setting unit 12 may take the average for each predetermined divided area to set a reference disparity for each area.

The search range setting unit 13 sets a search range according to the reference disparity. For example, the search range setting unit 13 may set a search range by taking into account the dispersion of the heights of the three-dimensional data of the selected points. In a case where the image range is divided into a plurality of areas, a search range may be set for each divided area.

The stereo matching unit 11 searches for matching points between the plurality of images according to the reference disparity and search range that have been set, and extracts a pair of matching points. In a case where a reference disparity and a search range are set for each divided area, matching points are searched out from each search range. The height calculating unit 2 generates DSM data according to the principle of triangulation, based on the disparity between the matching points obtained by the stereo matching process.

Figure 12:
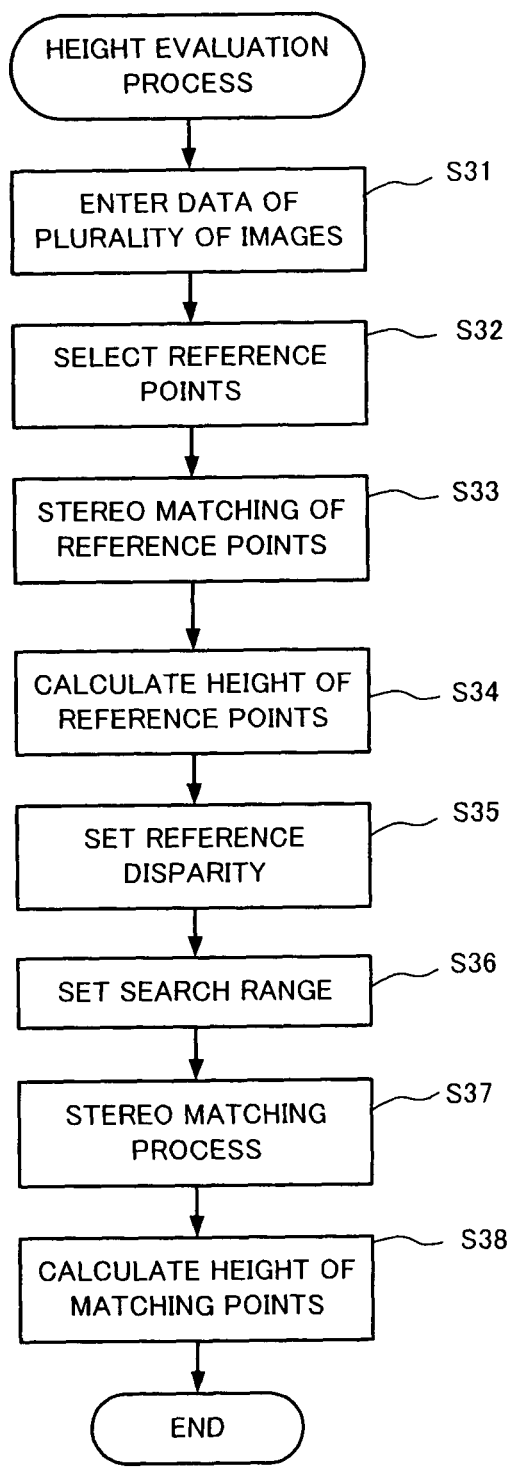
FIG. 12 is a flowchart showing one example of an operation of a height evaluation process according to Embodiment 3.

FIG. 12 is a flowchart showing one example of an operation of a height evaluation process according to Embodiment 3. When the image data input unit 10 enters a plurality of images to which a stereo matching process will be applied (step S31), the reference point setting unit 16 selects reference points from the image in a predetermined manner (step S32). The stereo matching unit 11 performs a stereo matching process for the selected reference points to extract pairs of matching points in the plurality of images (step S33).

The reference point setting unit 16 calculates the heights of the reference points based on the matched pairs of the selected points (step S34). The reference disparity setting unit 12 sets a reference disparity based on the heights of the reference points (step S35). Here, the reference disparity setting unit 12 may set a reference disparity based on the matched pairs of the selected points (i.e., the reference point setting unit 16 may not calculate the heights of the selected points). The search range setting unit 13 sets a search range according to the reference disparity (step S36).

The stereo matching unit 11 searches out, for a point in one image, a point in the other image that matches it from the search range set for each area, by referring to a point in the other image that provides the reference disparity (step S37). The height calculating unit 2 calculates the height of each point and the coordinates of the points on the map, based on the positions of the point in the plurality of images that are matched together between the images (step S38).

The stereo image processing apparatus 1 according to Embodiment 3 can restrict a search range to a small range, which is suitable for the image, and in which a matching point can exist, even if there is no map data. As a result, the stereo image processing apparatus 1 can perform a stereo matching process speedily and accurately.

Embodiment 4

Figure 13:
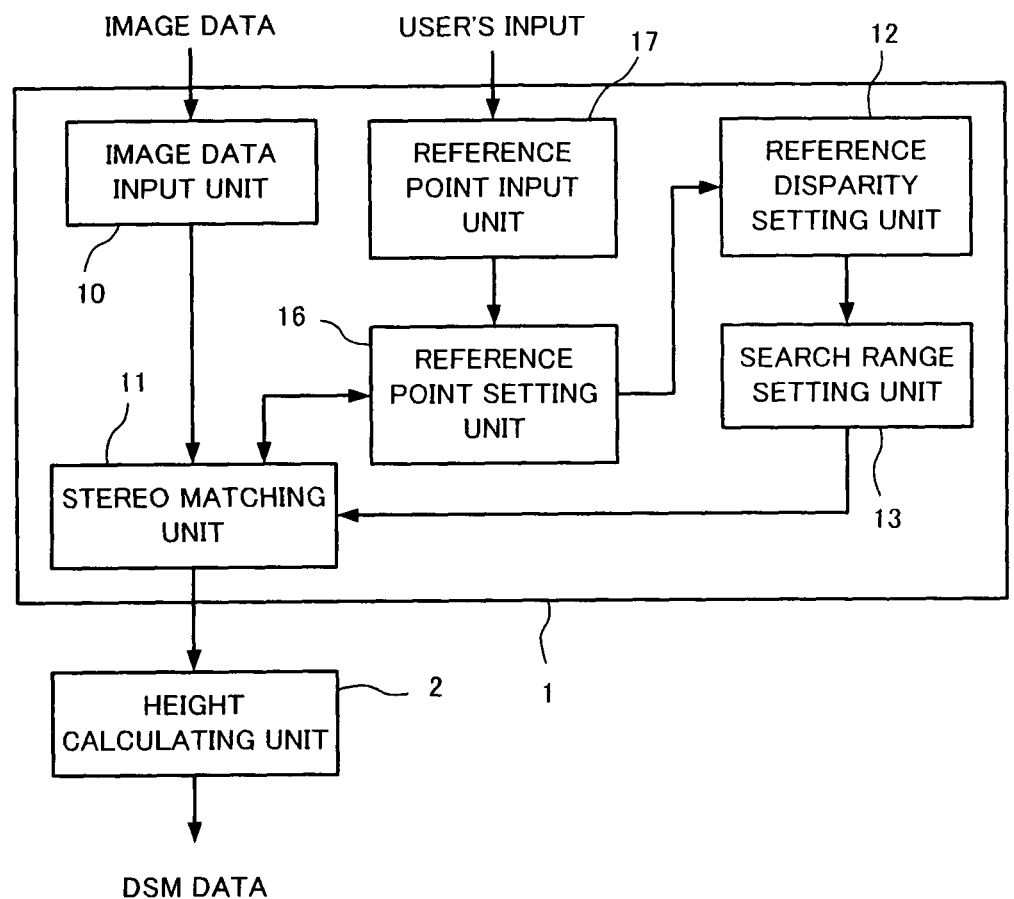
FIG. 13 is a block diagram showing an example configuration of a stereo image processing apparatus 1 according to Embodiment 4.

FIG. 13 is a block diagram showing an example configuration of a stereo image processing apparatus 1 according to Embodiment 4. The stereo image processing apparatus 1 according to Embodiment 4 enters the reference point according to Embodiment 3 from the outside. The stereo image processing apparatus 1 shown in FIG. 13 includes a reference point input unit 17 in addition to the components of Embodiment 3.

The reference point input unit 17 enters data that indicates the position of a reference point in an image. For example, the reference point input unit 17 may display image data on a display device (unillustrated) and enters a point selected from the display screen. The reference point input unit 17 may enter data indicating the coordinates in the image.

The reference point setting unit 16, the reference disparity setting unit 12, the search range setting unit 13, and the stereo matching unit 11 operate in the same way as in Embodiment 3.

According to Embodiment 4, a reference point that is considered to be suitable can be set from an entered image. It is possible to select, for example, a feature point of an artificial terrestrial object including an airway beacon of a tall building, a feature point of a steel tower, a building, etc., i.e., a point that is considered to be suitable as a setter of a reference altitude thereby to enable accurate stereo matching.

Figure 14:
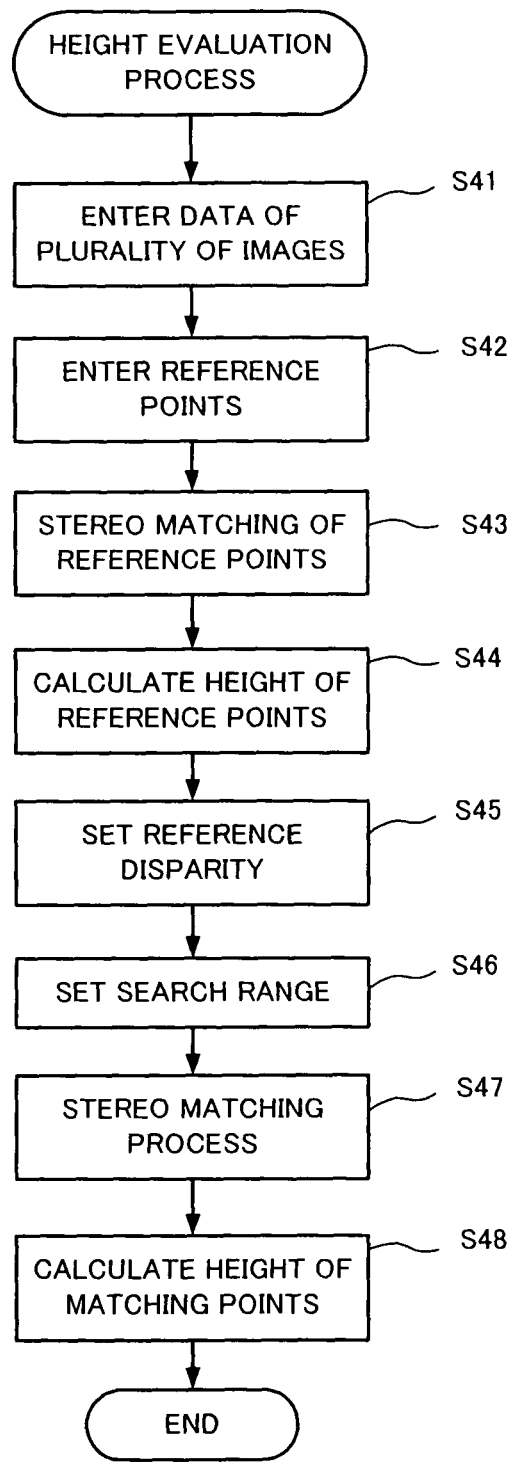
FIG. 14 is a flowchart showing one example of an operation of a height evaluation process according to Embodiment 4.

FIG. 14 is a flowchart showing one example of an operation of a height evaluation process according to Embodiment 4. When the image data input unit 10 enters a plurality of images to which a stereo matching process will be applied (step S41), the reference point input unit 17 enters data that indicates the position of a reference point in the image (step S42). A plurality of reference points may be selected.

The reference point setting unit 16 sends the position of the point that is entered to the stereo matching unit 11, and the stereo matching unit 11 performs a stereo matching process for the selected reference point to extract a pair of points that match each other between the plurality of images (step S43). The reference point setting unit 16 calculates the height of the reference point based on the matched pair of the selected point (step S44). Thereafter, the process from the setting of a reference disparity (step S45) to the calculation of the height of matching points (step S48) is the same as the process from step S35 to step S38 shown in FIG. 12.

The stereo image processing apparatus 1 according to Embodiment 4 can select a point that provides an appropriate reference disparity suitable for the image and that enables accurate stereo matching, besides Embodiment 3. As a result, the stereo image processing apparatus 1 can perform a stereo matching process speedily and accurately.

Embodiment 5

Figure 15:
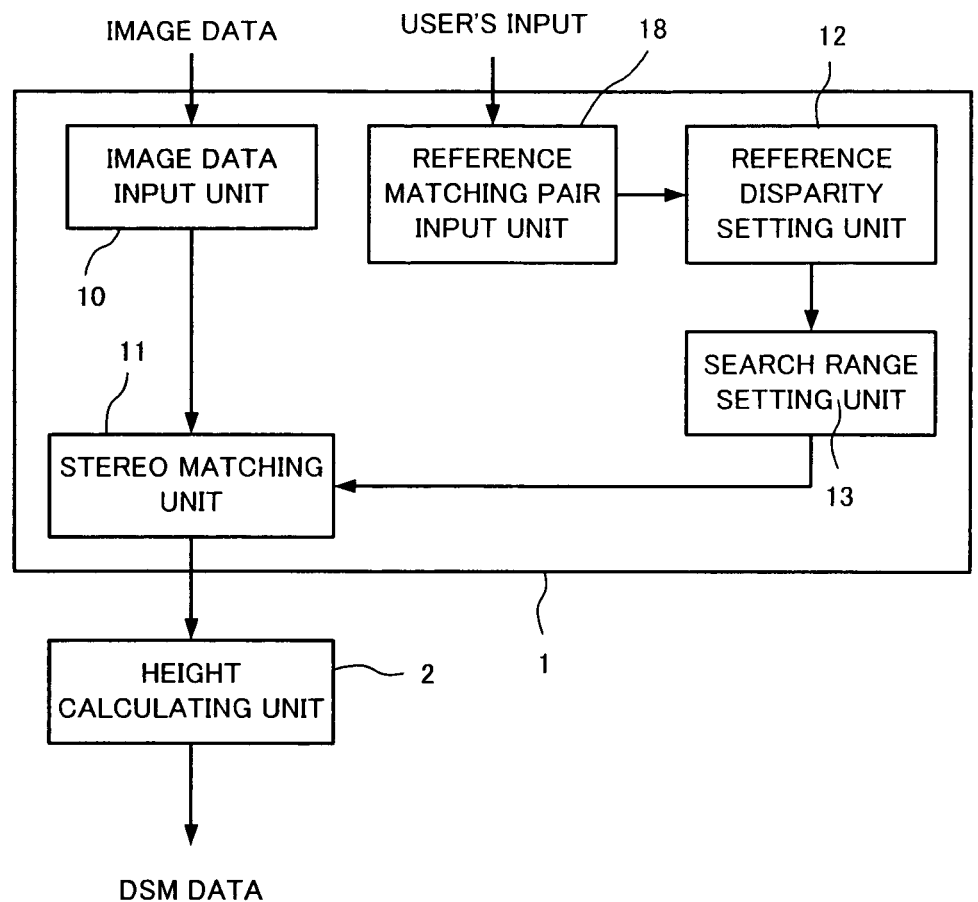
FIG. 15 is a block diagram showing an example configuration of a stereo image processing apparatus 1 according to Embodiment 5.

FIG. 15 is a block diagram showing an example configuration of a stereo image processing apparatus 1 according to Embodiment 5. The stereo image processing apparatus 1 according to Embodiment 5 enters from the outside, the reference point according to Embodiment 3, and its paired point that matches it if stereo matching is applied. The stereo image processing apparatus 1 shown in FIG. 15 includes a reference matching pair input unit 18, instead of the reference point input unit 17 and the reference point setting unit 16 according to Embodiment 3.

The reference matching pair input unit 18 enters data that indicates the position of a reference point in an image and the position of a point in the other image that matches the point in the sense of stereo matching. For example, the reference matching pair input unit 18 may display two pieces of image data on a display device (unillustrated), and enter a pair of matching points that are selected from the display screen. The reference matching pair input unit 18 may alternatively enter data that indicates the coordinates of a pair of matching points in the two images.

The reference disparity setting unit 12, the search range setting unit 13, and the stereo matching unit 11 operate in the same way as in Embodiment 1.

According to Embodiment 5, it is possible to set a pair of reference matching points that are considered to be suitable, from the entered images. It is possible to select matching points of, for example, a feature point of an artificial terrestrial object including an airway beacon of a tall building, a feature point of a steel tower, a building, etc., i.e., a point that is considered to be suitable as a setter of a reference altitude.

Figure 16:
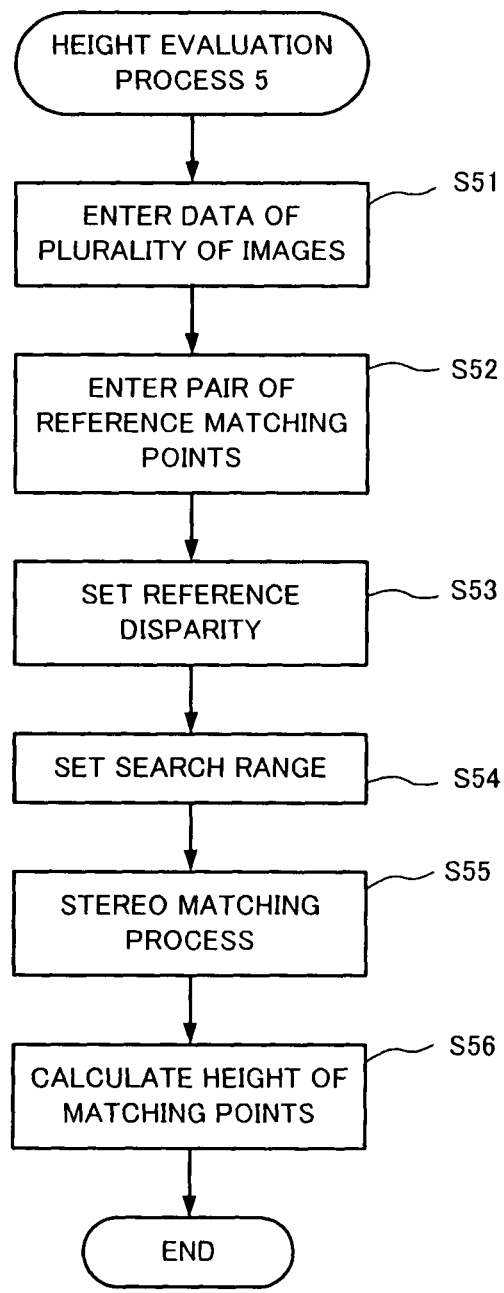
FIG. 16 is a flowchart showing one example of an operation of a height evaluation process according to Embodiment 5.

FIG. 16 is a flowchart showing an example of an operation of a height evaluation process according to Embodiment 5. When the image data input unit 10 enters a plurality of images to which a stereo matching process will be applied (step S51), the reference matching pair input unit 18 enters data that indicates the positions, in two of the plurality of images, of a pair of reference matching points that match each other in the sense of stereo matching (step S52). A plurality of references may be selected.

Thereafter, the process from the setting of a reference disparity (step S53) to the calculation of the height of matching points (step S56) is the same as the process from step S35 to step S38 shown in FIG. 12.

The stereo image processing apparatus 1 according to Embodiment 5 can set a reference disparity and a search range by selecting matching points that provide an appropriate reference disparity suitable for the images and that match each other in the sense of stereo matching. As a result, the stereo image processing apparatus 1 can perform a stereo matching process speedily and accurately.

Figure 17:
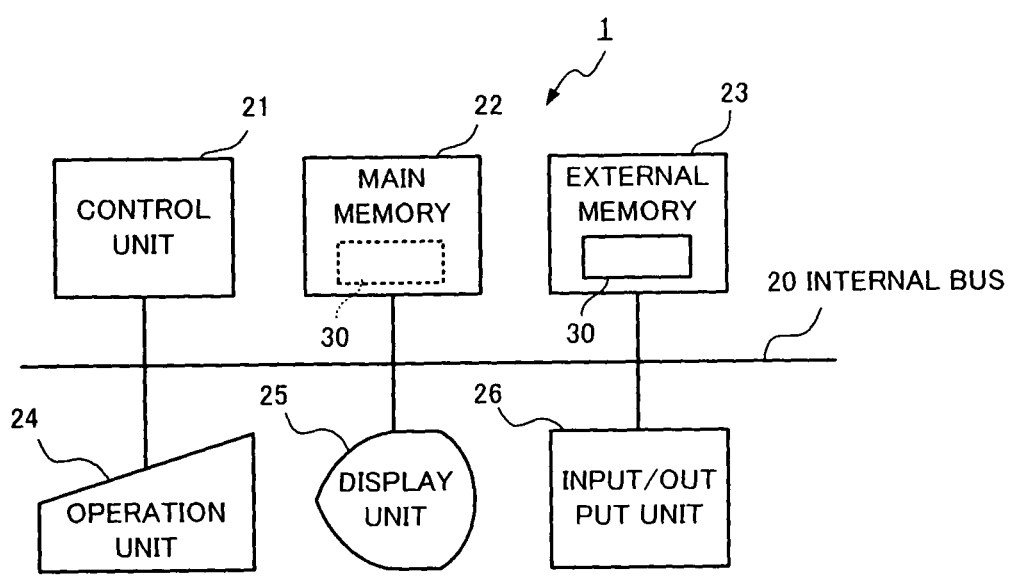
FIG. 17 is a block diagram showing an example physical configuration of a stereo image processing apparatus 1 implemented on a computer.

FIG. 17 is a block diagram showing an example physical configuration of the stereo image processing apparatus 1 implemented on a computer. The stereo image processing apparatus 1 according to the present embodiments can be embodied by a similar hardware configuration to that of an ordinary computer apparatus. As shown in FIG. 17, the stereo image processing apparatus 1 includes a control unit 21, a main memory 22, an external memory 23, an operation unit 24, a display unit 25, and an input/output unit 26. The main memory 22, the external memory 23, the operation unit 24, the display unit 25, and the input/output unit 26 are all connected to the control unit 21 via an internal bus 20.

The control unit 21 is constituted by a Central Processing Unit (CPU) or the like, and performs a stereo matching process in accordance with a control program 30 stored in the external memory 23.

The main memory 22 is constituted by a Random-Access Memory (RAM) or the like, loads the control program 30 stored in the external memory 23, and is used as a work area of the control unit 21.

The external memory 23 is constituted by a nonvolatile memory such as a flash memory, a hard disk, a Digital Versatile Disc Random-Access Memory (DVD-RAM), a Digital Versatile Disc ReWritable (DVD-RW), or the like, and prestores the control program 30 for controlling the control unit 21 to perform the above-described processes. In accordance with an instruction from the control unit 21, the external memory 23 supplies data stored therein by the control program 30 to the control unit 21, and stores therein data supplied from the control unit 21.

The operation unit 24 is constituted by a keyboard, a pointing device, etc. such as a mouse, etc., and an interface device that connects the keyboard and the pointing device, etc. to the internal bus 20. Image data, instructions for sending, receiving, etc., designation of an image to be displayed, a position in an image of a reference point that sets a reference altitude, etc. are entered via the operation unit 24 and supplied to the control unit 21.

The display unit 25 is constituted by a Cathode Ray Tube (CRT), a Liquid Crystal Display (LCD), or the like, and displays images and the result of stereo matching of the images.

The input/output unit 26 is constituted by a wireless transmitting/receiving device, a wireless modem or a network terminating device, and a serial interface or a Local Area Network (LAN) interface or the like that connects with them. Image data can be received or a calculation result can be transmitted via the input/output unit 26.

The processes of the image data input unit 10, the stereo matching unit 11, the reference disparity setting unit 12, the search range setting unit 13, the map data input unit 14, the area dividing unit 15, the reference point setting unit 16, the reference point input unit 17, and the reference matching pair input unit 18 of the stereo image processing apparatus 1 shown in FIG. 1, FIG. 8, FIG. 11, FIG. 13, or FIG. 15 are performed by the control program 30 using the control unit 21, the main memory 22, the external memory 23, the operation unit 24, the display unit 25, and the input/output unit 26, etc. as resources.

Other than the above, a preferred modification of the present invention is configured as follows.

Preferably, a stereo matching processing apparatus according to a first aspect of the present invention is characterized in that: the reference disparity setting means preferably divides each of the plurality of images into two or more areas that respectively correspond to two or more areas divided in the other of the plurality of images, and sets the reference disparity for each area; and the search range setting means sets a predetermined range smaller than the image range as a search range for stereo matching, by referring to points in the images between which the reference disparity set for each area is provided.

Preferably, the stereo matching processing apparatus includes map data acquiring means that acquires altitude data of a map that corresponds to the plurality of images, and the reference disparity setting means sets the reference disparity based on the altitude data acquired by the map data acquiring means.

Alternatively, the reference disparity setting means may calculate disparities by stereo matching for points that are selected in a predetermined manner from the plurality of images, and set the reference disparity based on the calculated disparities.

The stereo matching processing apparatus may further include reference point inputting means that acquires the positions, in the plurality of images, of points for which disparities are to be calculated, and the reference disparity setting means may calculate disparities by stereo matching for the points acquired by the reference point inputting means, and set the reference disparity based on the calculated disparities.

Alternatively, the stereo matching processing apparatus may include matching pair inputting means that enters a pair of matching points, in the plurality of images, that match each other in the sense of stereo matching, and the reference disparity setting means may set the reference disparity based on a disparity provided between the pair of matching points that are entered by the matching pair inputting means.

Preferably, a stereo matching processing method according to a second aspect of the present invention is characterized in that: at the reference disparity setting step, a pair of images to which the stereo matching process will be applied is divided into two or more areas that respectively correspond to two or more areas divided in the other of the images, and the reference disparity is set for each area; and at the search range setting step, with reference to points in the images between which the reference disparity set for each area is provided, a predetermined range that is smaller than the image range is set as a search range for stereo matching.

The stereo matching processing method preferably includes a map data acquiring step of acquiring altitude data of a map that corresponds to the plurality of images, and at the reference disparity setting step, the reference disparity is set based on the altitude data acquired at the map data acquiring step.

Alternatively, at the reference disparity setting step, disparities may be calculated by stereo matching for points that are selected in a predetermined manner from the plurality of images, and the reference disparity may be set based on the calculated disparities.

The stereo matching processing method may include a reference point inputting step of acquiring the positions, in the plurality of images, of points for which disparities are to be calculated, and at the reference disparity setting step, disparities may be calculated by stereo matching for the points acquired at the reference point inputting step, and the reference disparity may be set based on the calculated disparities.

Alternatively, the stereo matching processing method may include a matching pair inputting step of entering a pair of matching points, in the plurality of images, that match each other in the sense of stereo matching, and at the reference disparity setting step, the reference disparity may be set based on the disparity provided between the pair of matching points that are entered at the matching pair inputting step.

Additionally, the hardware configuration and flowcharts shown above are examples, and may be arbitrarily changed or modified.

The main part to perform the processes of the stereo image processing apparatus 1 including the control unit 21, the main memory 22, the external memory 23, the operation unit 24, the input/output unit 26, the internal bus 20, etc. can be embodied by an ordinary computer system, not by a dedicated system. For example, a computer program for performing the above-described operations may be distributed as stored in a computer-readable recording medium (a flexible disk, a CD-ROM, a DVD-ROM, etc.), and installed on a computer, so that the stereo image processing apparatus 1 for performing the above processes may be configured. Further, the computer program may be stored on a storage device that is possessed by a server apparatus on a communication network such as the Internet, etc. so that an ordinary computer system may download the program and configure the stereo image processing apparatus 1.

In a case where the functions of the stereo image processing apparatus 1 are realized by being taken charge of by an Operating System (OS) and an application program dividedly or by the OS and the application program working in cooperation, only the part of the application program may be stored on a recording medium or a storage device.

Furthermore, the computer program may be embedded on a carrier wave so as to be distributed via a communication network. For example, the computer program may be posted on a Bulletin Board System (BBS) on a communication network, and the computer program may be distributed via the network. The above processes may be performed when the computer program is activated and executed under the control of the OS in the same way as that in which any other application program is executed.

INDUSTRIAL APPLICABILITY

According to the present invention, it is possible to improve the speed and accuracy of a stereo matching process in a method of automatically generating three-dimensional data from stereo images.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A stereo matching processing apparatus, comprising:
an image data acquiring unit that acquires image data of a plurality of images of a region, the plurality of images being captured at substantially a same time at a plurality of different positions so as to contain an overlapping portion;
a reference disparity setting unit that sets a disparity provided when a point at a reference height in a real space is seen from points in the plurality of images corresponding to the point at the reference height as a reference disparity that is suitable for the plurality of images, the disparity being a difference in an apparent direction of an object in the region having been captured as seen from different positions, the different positions being non-collinear with the object in the region having been captured;
a search range setting unit that sets a predetermined range that is smaller than the overlapping portion of the plurality of images as a search range for stereo matching, by referring to points in the plurality of images between which the reference disparity set by said reference disparity setting unit is provided; and
a searching unit that searches out, for an arbitrary point in one image of the plurality of images, a point in an other image of the plurality images that matches the arbitrary point, from the search range set by said search range setting unit, by referring to the point in the other image that provides the reference disparity set by said reference disparity setting unit.

2. The stereo matching processing apparatus according to claim 1, wherein said reference disparity setting unit divides each of the plurality of images into two or more areas that respectively correspond to two or more areas divided in the other image of the plurality of images, and sets the reference disparity for each area, and
wherein said search range setting unit sets the predetermined range that is smaller than the overlapping portion of the plurality of images as the search range for stereo matching, by referring to the points in the plurality of images between which the reference disparity that is set for each area is provided.

3. The stereo matching processing apparatus according to claim 1, further comprising a map data acquiring unit that acquires altitude data of a map that corresponds to the plurality of images,
wherein said reference disparity setting unit sets the reference disparity based on the altitude data acquired by said map data acquiring unit.

4. The stereo matching processing apparatus according to claim 1, wherein said reference disparity setting unit calculates the disparities by stereo matching for points that are selected in a predetermined manner from the plurality of images, and sets the reference disparity based on the calculated disparities.

5. The stereo matching processing apparatus according to claim 4, further comprising a reference point inputting unit that acquires positions, in the plurality of images, of the points for which the disparities are to be calculated,
wherein said reference disparity setting unit calculates the disparities by stereo matching for the points acquired by said reference point inputting unit, and sets the reference disparity based on the calculated disparities.

6. The stereo matching processing apparatus according to claim 1, further comprising a matching pair inputting unit that enters a pair of matching points, in the plurality of images, that match each other in a sense of stereo matching,
wherein said reference disparity setting unit sets the reference disparity based on a disparity provided between the pair of matching points entered by said matching pair inputting unit.

7. The stereo matching processing apparatus according to claim 2, further comprising a map data acquiring unit that acquires altitude data of a map that corresponds to the plurality of images,
wherein said reference disparity setting unit sets the reference disparity based on the altitude data acquired by said map data acquiring unit.

8. The stereo matching processing apparatus according to claim 2, wherein said reference disparity setting unit calculates disparities by stereo matching for points that are selected in a predetermined manner from the plurality of images, and sets the reference disparity based on the disparities having been calculated.

9. The stereo matching processing apparatus according to claim 2, further comprising a matching pair inputting unit that enters a pair of matching points, in the plurality of images, that match each other in a sense of stereo matching, wherein said reference disparity setting unit sets the reference disparity based on a disparity provided between the pair of matching points entered by said matching pair inputting unit.

10. The stereo matching processing apparatus according to claim 1, wherein the image data acquiring unit successively acquires the plurality of images.

11. The stereo matching processing apparatus according to claim 1, wherein the reference disparity setting unit sets the disparity from information of a point of view from which an image capturing is performed for stereo matching.

12. A stereo matching processing method, comprising:
acquiring image data of a plurality of images of a region, the plurality of images being captured at substantially a same time from a plurality of different positions so as to contain an overlapping portion;

setting a disparity when a point at a reference height in a real space is seen from points in the plurality of images corresponding to the point at the reference height as a reference disparity that is suitable for the plurality of images, the disparity being a difference in an apparent direction of an object in the region having been captured as seen from different positions, the different positions being non-collinear with the object in the region having been captured;

setting a predetermined range that is smaller than the overlapping portion of the plurality of images as a search range for stereo matching, by referring to points in the plurality of images between which the reference disparity having been set to be suitable for the plurality of images is provided; and searching out, for an arbitrary point in one image of the plurality of images, a point in a other image of the plurality of images that matches the arbitrary point, from the search range set at said search range set to be smaller than the overlapping portion of the plurality of images, by referring to the point in the other image that provides the reference disparity set to be suitable for the plurality of images.

13. The stereo matching processing method according to claim 12, wherein in setting the reference disparity suitable for the plurality of images, a pair of images, to which the stereo matching will be applied, is divided into two or more areas that respectively correspond to two or more areas divided in the other of the pair of images, and the reference disparity is set for each area, and wherein in setting the predetermined range that is smaller than the overlapping portion of the plurality of images, with reference to points in the images between which the reference disparity set for each area is provided, a predetermined range that is smaller than overlapping portion of the plurality of images is set as the search range for stereo matching.

14. The stereo matching processing method according to claim 12, further comprising acquiring altitude data of a map that corresponds to the plurality of images, wherein in setting the reference disparity suitable for the plurality of images, the reference disparity is set based on the altitude data that has been acquired.

15. The stereo matching processing method according to claim 12, wherein in setting the reference disparity suitable for the plurality of images, the disparities for the points are selected in a predetermined manner from the plurality of images and are calculated by stereo matching, and wherein the reference disparity is set based on the disparities that are calculated by stereo matching.

16. The stereo matching processing method according to claim 15, further comprising acquiring positions, in the plurality of images, of the points for which the disparities are to be calculated, wherein in setting the reference disparity suitable for the plurality of images, the disparities are calculated by stereo matching for the acquired positions of the points, and the reference disparity is set based on the disparities that are calculated by stereo matching.

17. The stereo matching processing method according to claim 12, further comprising entering a pair of matching points, in the plurality of images, that match each other in a sense of stereo matching, and wherein in setting the reference disparity suitable for the plurality of images, the reference disparity is set based on a disparity provided between the pair of matching points that are entered.

18. The stereo matching processing method according to claim 13, further comprising acquiring altitude data of a map that corresponds to the plurality of images, wherein in setting the reference disparity suitable for the plurality of images, the reference disparity is set based on the altitude data that has been acquired.

19. The stereo matching processing method according to claim 13, wherein in setting the reference disparity suitable for the plurality of images, the disparities for the points are selected in a predetermined manner from the plurality of images and are calculated by stereo matching, and wherein the reference disparity is set based on the disparities having been calculated.

20. The stereo matching processing method according to claim 13, further comprising entering a pair of matching points, in the plurality of images, that match each other in a sense of stereo matching, and wherein in setting the reference disparity suitable for the plurality of images, the reference disparity is set based on a disparity provided between the pair of matching points that are entered.

21. A non-transitory computer-readable recording medium that stores a program for controlling a computer to function as:

an image data acquiring unit that acquires image data of a plurality of images of a region, the plurality of images being captured at substantially a same time from a plurality of different positions so as to contain an overlapping portion;

a reference disparity setting unit that sets a disparity provided when a point at a reference height in a real space is seen from points in the plurality of images corresponding to the point at the reference height as a reference disparity that is suitable for the plurality of images, the disparity being a difference in an apparent direction of an object in the region having been captured as seen from different positions, the different positions being non-collinear with the object in the region having been captured;

a search range setting unit that sets a predetermined range that is smaller than the overlapping portion of the plurality of images as a search range for stereo matching, by referring to points in the plurality of images between which the reference disparity set by said reference disparity setting unit is provided; and a searching unit that searches out, for an arbitrary point in one image of the plurality of images, a point in an other image of the plurality of images that matches the arbitrary point, from the search range set by said search range setting unit, by referring to the point in the other image that provides the reference disparity set by said reference disparity setting unit.

* * * * *